No. 610,932. Patented Sept. 20, 1898.
N. F. VETERE.
LOCK.
(Application filed May 11, 1898.)
(No Model.) 4 Sheets—Sheet 1.
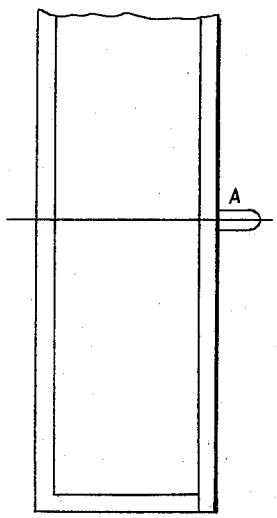
Fig.1.
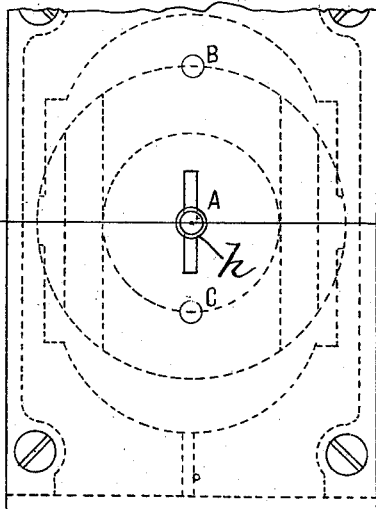
Fig.2.
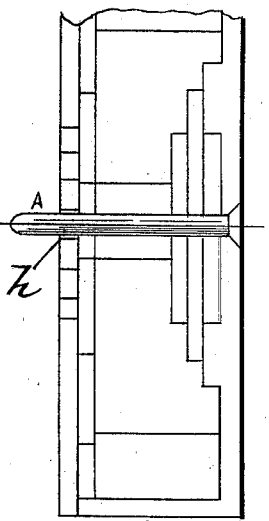
Fig.3.
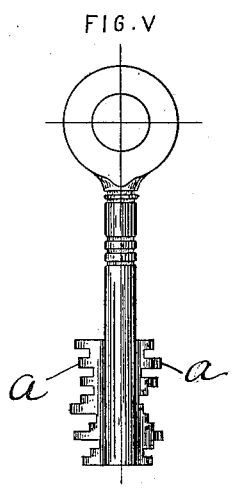
FIG. V
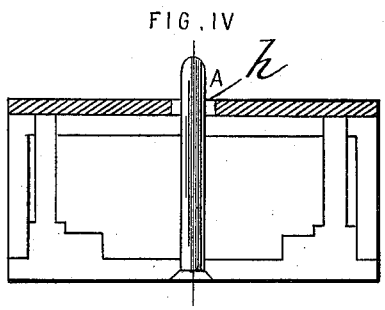
FIG. IV
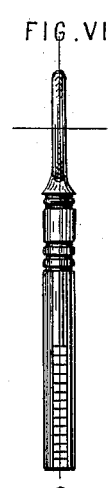
FIG. VI
FIG. VII
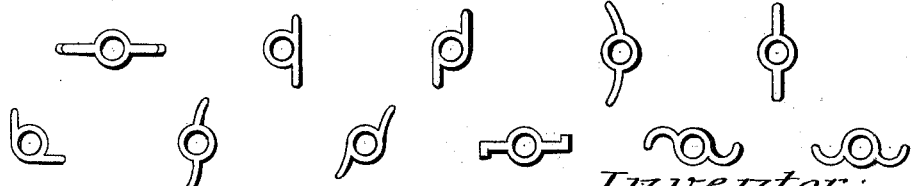
Witnesses:
E. R. Bolton
Inventor:
Nicolas Felix Vetere
By 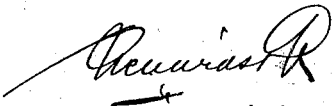
his Attorneys
THE NORRIS PETERS CO., PHOTO-LITHO., WASHINGTON, D. C.

No. 610,932. N. F. VETERE. Patented Sept. 20, 1898.
LOCK.
(Application filed May 11, 1898.)
(No Model.) 4 Sheets—Sheet 2.
FIG. VIII
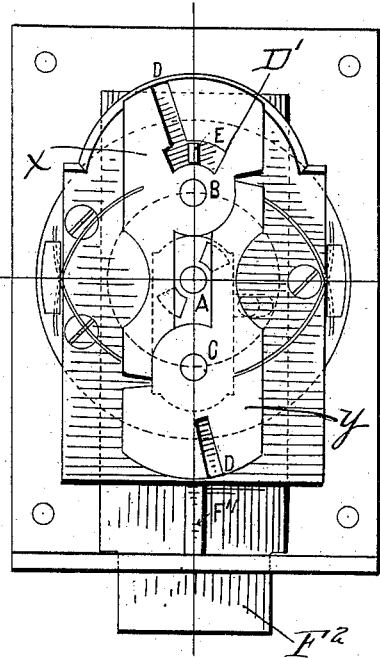
FIG. IX
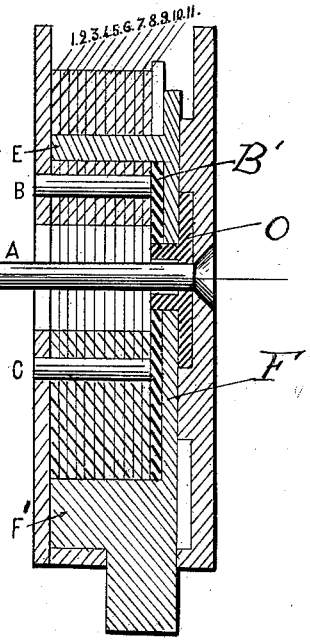
FIG. X
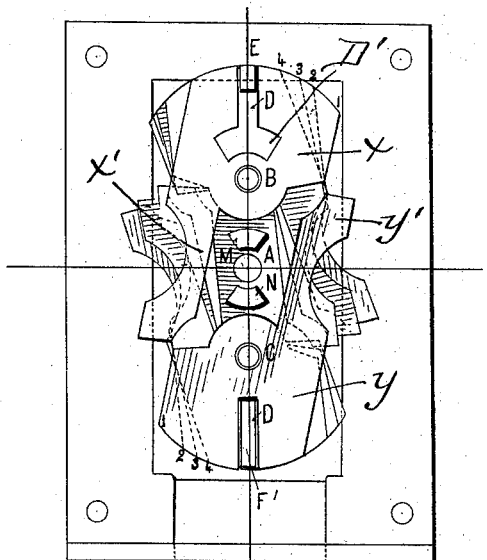
FIG. XI
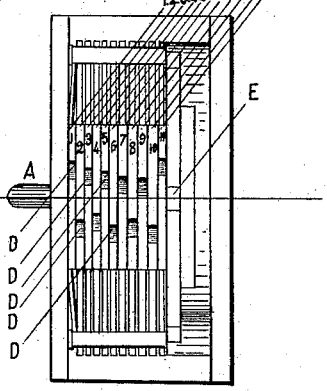
Inventor:
Nicolas Felix Vetere
Witnesses:
By his Attorneys No. 610,932. Patented Sept. 20, 1898.
N. F. VETERE.
LOCK.
(Application filed May 11, 1898.)
(No Model.) 4 Sheets—Sheet 3.
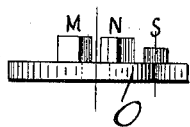
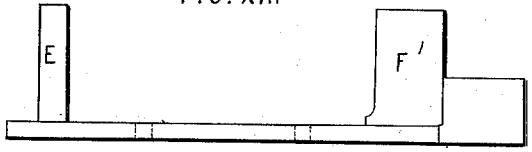
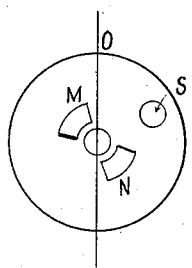
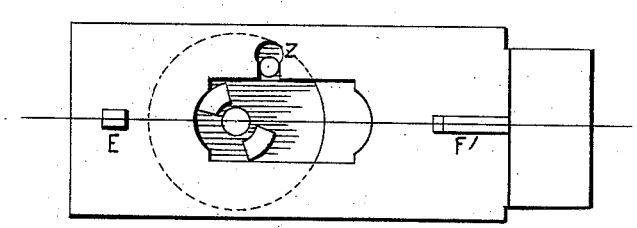
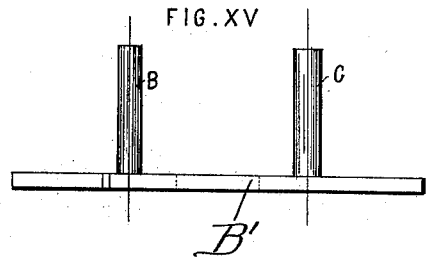
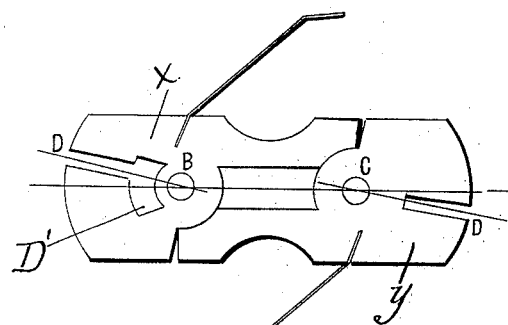
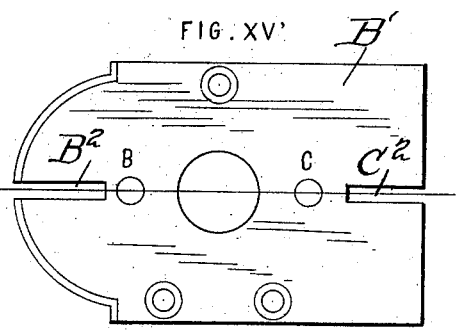
Witnesses:
E. B. Bolton
Inventor:
Nicolas Felix Vetere
By his Attorneys.

No. 610,932. Patented Sept. 20, 1898.
N. F. VETERE.
LOCK.
(Application filed May 11, 1898.)
(No Model.) 4 Sheets—Sheet 4.
FIG. XVI
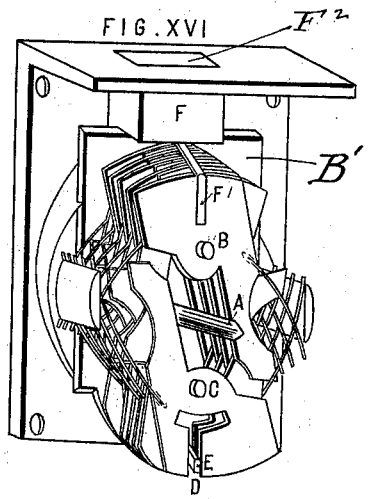
FIG. XVII
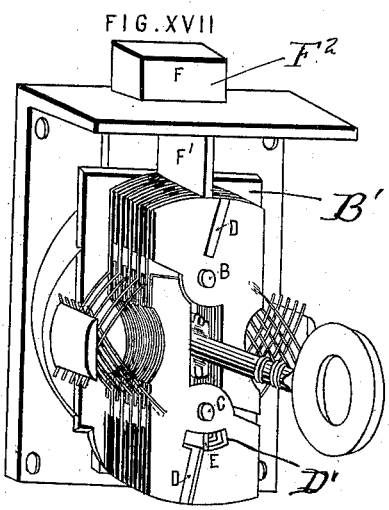
Witnesses:
Inventor:
Nicolas Felix Vetere
By
his Attorneys
THE NORRIS PETERS CO., PHOTO-LITHO., WASHINGTON, D. C.

UNITED STATES PATENT OFFICE.

NICOLAS FELIX VETERE, OF BUENOS AYRES, ARGENTINA.

LOCK.

SPECIFICATION forming part of Letters Patent No. 610,932, dated September 20, 1898.

Application filed May 11, 1898. Serial No. 680,404. (No model.)

*To all whom it may concern:*

Be it known that I, NICOLAS FELIX VETERE, single, machinist, a subject of the King of Italy, residing at No. 570 Calle Gascon, in the city of Buenos Ayres, in the Argentine Republic, have invented certain new and useful Improvements in a System of Locks for Iron Safes, called "The Universal Safety Treasury Lock, Vetere System;" and I do hereby declare the following to be a full, clear, and complete description of the invention, such as will enable others skilled in the art to which it appertains to make and use the same.

My invention includes the special combination of devices, as hereinafter set forth and particularly claimed.

In the drawings, Figure 1 is a view of the outside of the casing. Fig. 2 is a side view of the lock with the inner parts shown in dotted lines. Fig. 3 is a vertical transverse section through the lock. Fig. 4 is a horizontal sectional view of the lock. Figs. 5 and 6 are views of the keys. Fig. 7 represents end views of various forms of keys. Fig. 8 is a side view of the tumblers and adjacent parts in the position when the lock is closed. Fig. 9 is a sectional view representing the tumblers in place. Fig. 10 is a view similar to Fig. 8, but with the parts in a different position—that is, when the lock is open. Fig. 11 is a top view with the top plate removed showing the positions of the gatings in the tumblers. Figs. 12 and 12' are views of the cam-plate. Figs. 13 and 13' are views of the fence-bar. Fig. 14 is an edge view of one of the tumblers. Fig. 14' is a face view of a pair of tumblers with their attached springs. Figs. 15 and 15' are views of detail parts. Fig. 16 is a perspective view with parts of the casing removed to show the tumblers and springs. Fig. 17 is a view similar to Fig. 16 with the parts in a different position.

Upon pivot-pins B C within the casing and supported by the partition-plates B' two sets of tumblers $x\,y$ are supported, with their tail portions $x'\,y'$ extending in opposite directions and on opposite sides of the key-pin A, which is secured to the casing on one side and passes through the keyhole $h$ of the opposite side of the lock to guide the key. The key has bits $a$, adapted to engage the tailpieces of both sets of tumblers simultaneously, and when the key is turned the tumblers are moved from the position shown in Figs. 8 and 17 to the positions shown in Figs. 10 and 16, and this movement brings the gatings D in each set of tumblers into line with each other and with the gatings $B^2\,C^2$ in the partition-plate B', which holds the pivot-pins of the tumblers. The distance between the key-pin A and the pivots B C of the tumblers is less than that between the said pivots and the ends of the tumblers carrying the gatings, so that a small movement imparted to the tailpieces of the tumblers by the key will result in a larger movement to outer ends of the tumblers.

The movement of the tumblers to aline the gatings results from a one-half turn of the key. After the movement of the key of a half-turn from right to left, setting thus the tumblers, the wards or bits of the key come in contact with the cams M and N of a cam-plate O, which is arranged on the key-pin to rotate. It is rotated by the further movement of the key, and in so doing a pin S, extending from the face of the cam-plate near its periphery and engaging a notch Z in the lock-bolt F, moves said lock-bolt, so that the fences E F' will move freely in the gatings of the tumblers and partition-plate.

The fence E is normally located in lateral extensions D' of the gatings in one set of tumblers and out of line with the main part of the gating, so that said fence is prevented from moving until the tumblers are moved to make their gatings aline.

To close the lock, the movement is simply reversed. The cam-plate, being moved by the bits of the key, operates the lock-bolt, so that the fence E comes opposite to the lateral gating extension D' and the fence F' leaves the other gating entirely. The lock-bolt is now in position to prevent the operation of the lock, and immediately this position is assumed and the key is turned further the tumblers all assume their positions of Fig. 17, with their gatings out of line with each other, so that it will be impossible to operate the lock-bolt. The key when turned to make the tumblers aline and unlock the locking mechanism cannot be removed until the locking mechanism is again locked by turning the key in the other direction.

It will be noticed in Fig. 9 that the partition-plate B', carrying the pivots B C of the tumblers, separates the fence-bar from the tumblers.

The nose of the lock-bolt, projecting to engage the keeper, is shown at F².

I claim—

1. In combination, the casing, the pivots B and C therein, the two sets of tumblers pivoted on the pivots B and C respectively and having their free ends extending from each other and facing in opposite directions, the tumblers having also tailpieces extending normally parallel with each other and on opposite sides of a line drawn through the pivots B, C, each set of tumblers having gatings and one set having the lateral extensions D' thereof, a lock-bolt having the fences E, F', a rotary cam-plate having a pin to operate the lock-bolt and having projections to be operated by the key and a key having double wards or bits, substantially as described.

2. In combination, the casing, the tumblers having the gatings, the partition-plate having the pivot-support for the tumblers, the lock-bolt having a fence to engage the gatings, the cam-plate having the projection to be operated by the key and the pin to engage the lock-bolt and the key for operating the tumblers and cam-plate, said partition separating the lock-bolt from the tumblers, substantially as described.

In testimony whereof I have affixed my signature in presence of two witnesses.

NICOLAS FELIX VETERE.

Witnesses:
K. E. MILLER,
P. A. BREWER.